US012510133B2

(12) United States Patent
Schlipper et al.

(10) Patent No.: US 12,510,133 B2
(45) Date of Patent: Dec. 30, 2025

(54) FALL ARREST SAFETY NET

(71) Applicant: MRM HK LIMITED, Western District (HK)

(72) Inventors: Robert Wesley Schlipper, Western District (HK); Luke Ritchie, Western District (HK)

(73) Assignee: MRM HK Limited, Western District (HK)

( * ) Notice: Subject to any disclaimer, the term of this patent is extended or adjusted under 35 U.S.C. 154(b) by 231 days.

(21) Appl. No.: 18/555,395

(22) PCT Filed: Mar. 23, 2022

(86) PCT No.: PCT/CN2022/082518
§ 371 (c)(1),
(2) Date: Oct. 13, 2023

(87) PCT Pub. No.: WO2022/218116
PCT Pub. Date: Oct. 20, 2022

(65) Prior Publication Data
US 2024/0209919 A1 Jun. 27, 2024

(30) Foreign Application Priority Data
Apr. 15, 2021 (HK) ........................... 32021029371.0

(51) Int. Cl.
*F16G 11/04* (2006.01)
*F21V 21/08* (2006.01)
*F21V 25/02* (2006.01)

(52) U.S. Cl.
CPC ........ *F16G 11/046* (2013.01); *F21V 21/0816* (2013.01); *F21V 25/02* (2013.01)

(58) Field of Classification Search
CPC ..... F16G 11/046; F21V 21/0816; F21V 25/02
See application file for complete search history.

(56) References Cited

U.S. PATENT DOCUMENTS 5,839,768 A 11/1998 Wackerlly
5,941,728 A * 8/1999 Okabe ................. H01R 4/2454 439/467
6,280,220 B1 * 8/2001 Horner ............... H01R 13/5208 439/275
8,414,367 B1 4/2013 Virag
(Continued)

FOREIGN PATENT DOCUMENTS

CN 212606800 2/2021
DE 202020100745 3/2020
EP 2256268 12/2010
(Continued)

*Primary Examiner* — Derek J Battisti
(74) *Attorney, Agent, or Firm* — Renner, Kenner, Greive, Bobak, Taylor & Weber

(57) ABSTRACT

A fall arrest safety net assembly has the form of a wire net bag constructed with a closed end and an opposing mouth drawn closed by a noose formed on a line by a running coupler fixed on one end of the line. A choker plate has two sides between which a plurality of openings extend openings that extend between the opposing sides. A line portion loops through the openings in the choker plate to secure the choker plate to the line outside the noose. A fastener fixed to the other end of the line is releasably fixable to the noose.

16 Claims, 3 Drawing Sheets

(56) References Cited

U.S. PATENT DOCUMENTS

| | | | | |
|---|---|---|---|---|
| 2015/0345158 | A1* | 12/2015 | Schlipper | B65D 29/04 383/117 |
| 2018/0094449 | A1* | 4/2018 | Batushanskiy | A45F 4/04 |

FOREIGN PATENT DOCUMENTS

| | | |
|---|---|---|
| ES | 2164519 | 2/2002 |
| ES | 2258353 | 8/2006 |
| GB | 2581438 | 8/2020 |
| JP | 1072749 | 3/1998 |
| JP | 2005119740 | 5/2005 |
| JP | 2008172858 | 7/2008 |

* cited by examiner

FALL ARREST SAFETY NET

TECHNICAL FIELD

The present invention relates to a safety net having an attachment device for securing to a construction element, particularly for use as a fall arrest apparatus to secure overhead fixtures individually.

BACKGROUND OF THE INVENTION

The patent publication EP2256268B1 describes a fall-arrest safety net assembly comprising a wire net bag that can hold a fixture to provide drop security for backing-up a primary attachment means. For instance, in offshore oil installations, the fixture may be an overhead light fixture that is a potential drop hazard. By inserting the fixture in the bag, components such as lenses and bulbs are captured and secured, along with the entire fixture itself. A line draws the mouth of the bag closed to enclose the fixture, and can be readily tied around adjacent structural members, thereby restraining the contents of the bag that might otherwise pose a safety risk to people below. The performance of this old safety net assembly is satisfactory, but there is an ongoing need for improvements in performance and manufacturing cost-effectiveness. It is an object of the present invention to address this need or, more generally, to provide an improved safety net.

DISCLOSURE OF THE INVENTION

According to one aspect of the present invention there is provided a safety net assembly comprising: a bag constructed of wire net, the bag having a mouth and a plurality of net apertures spaced peripherally about the mouth;

- a line having opposing first and second ends, first and second line portions of the line being disposed adjacent the first and second ends respectively, an intermediate line portion of the line located between the first and second line portions;
- a running coupler on the first end through which the first line portion extends, with the first line portion passing in a loop through the net apertures to form a noose for drawing the mouth closed;
- a choker plate having opposing sides and a plurality of openings that extend between the opposing sides, wherein the intermediate line portion loops through the openings in the choker plate to secure the choker plate to the line outside the noose, and
- a fastener fixed to the second end.

The line may be continuous, or it may alternatively be interrupted by fasteners, links, or the like, connected to adjacent ends of the line and which can be separated, for instance so that the noose loop may be broken as needed in some installations of the safety net assembly.

Preferably each opening in the choker plate is formed in a locally-thickened section and each opening has an arcuate inner surface of a waisted form that tapers to diverge from a central section of the opening toward both sides. By avoiding sharp internal edges in the opening in this way, the shock-loading capacity of the assembly is increased.

Preferably outermost rims of each opening lie in substantially parallel planes and the arcuate inner surface is curved to join both planes substantially tangentially. Preferably the choker plate is forged and the locally-thickened section comprises a projection on both of the sides.

Preferably the openings include three openings through which the line passes sequentially so that a loop in the line protrudes from each of the faces of the choker plate.

Preferably an RFID tag is fixed to the choker plate. Preferably the RFID tag is fixed to an envelope in which at least part of the choker plate is received. Preferably the envelope comprises holes disposed in registration with the openings.

Preferably the running coupler comprises the first end of the line turned back on itself, and fastened to the line to form a terminal eye.

Preferably the bag is formed from a net panel comprising a plurality of wire lengths that extend alongside one another, each length connected to an adjacent one of the lengths by longitudinally arrayed fixings, wherein the lengths comprise edge lengths extending along edges of the panel that are opposing and internal lengths disposed between the edge lengths, and the fixings alternately connect each internal length to adjacent ones of the lengths, a fold in the net panel turns the lengths back on themselves and forms a closed end opposite the mouth, and wherein sections of at least one edge length are directly connected together by the fixings.

Preferably the fold is transverse to the wire lengths and longitudinal ends of the panel, are brought together to form the mouth.

Preferably ends of the wire lengths are joined by two of the fixings.

Preferably a run is defined between adjacent fixings along each length, such that runs of the internal lengths define internal runs, and runs of the edge lengths define edge runs, and wherein the internal runs all have substantially the same length.

Optionally, the edge runs all have substantially the same length, and the internal runs are shorter than the edge runs.

In another aspect, the invention provides a bag formed from a net panel comprising a plurality of wire lengths that extend alongside one another with each length connected to an adjacent one of the lengths by longitudinally arrayed fixings, wherein the lengths comprise edge lengths extending along edges of the panel that are opposing and internal lengths disposed between the edge lengths, where the fixings alternately connect each internal length to adjacent ones of the lengths, a fold in the net panel turns the lengths back on themselves and forms a closed end of the bag opposite a mouth, whereby a plurality of net apertures are spaced peripherally about the mouth, and wherein sections of at least one edge length are directly connected together by the fixings.

Preferably the fold is transverse to the wire lengths and longitudinal ends of the panel, are brought together to form the mouth.

Preferably ends of the wire lengths are joined by two of the fixings.

Preferably a run is defined between adjacent fixings along each length, such that runs of the internal lengths define internal runs, and runs of the edge lengths define edge runs, and wherein the internal runs all have substantially the same lengthwise dimension.

Optionally, the edge runs all have substantially the same lengthwise dimension, and the internal runs are shorter than the edge runs.

The fixings are preferably ferrules crimped to the lengths, but suitable alternative fixings may include other alternative clips, welded or soldered joints etc.

Preferably the wire lengths comprise metal strands twisted together. Preferably there are no areas of plastic deformation in the wire lengths, and so the inherent elasticity of the wire lengths provides a resilient bag that tends to collapse to a compact closed state.

In yet a further aspect, the invention provides a method of securing apparatus mounted at height upon a construction member, the method comprising:

- providing a fall arrest safety net assembly substantially as described above;
- introducing the apparatus through the mouth so as to at least partially enclose the apparatus in the wire net bag;
- manipulating the choker plate and the line to draw the mouth closed;
- looping the second line portion about the construction member, and
- connecting the first line portion and the second end by means of a fastener.

This invention provides a safety net assembly which is effective and efficient in operational use and, in particular, provides improvements in load ratings and manufacturing cost-effectiveness.

BRIEF DESCRIPTION OF THE DRAWINGS

Preferred forms of the present invention will now be described by way of example with reference to the accompanying drawings, wherein:

FIG. 2 is a pictorial view of a fixture secured within the fall arrest safety net assembly of

FIG. 1;

DESCRIPTION OF THE PREFERRED EMBODIMENTS

Figure 2:
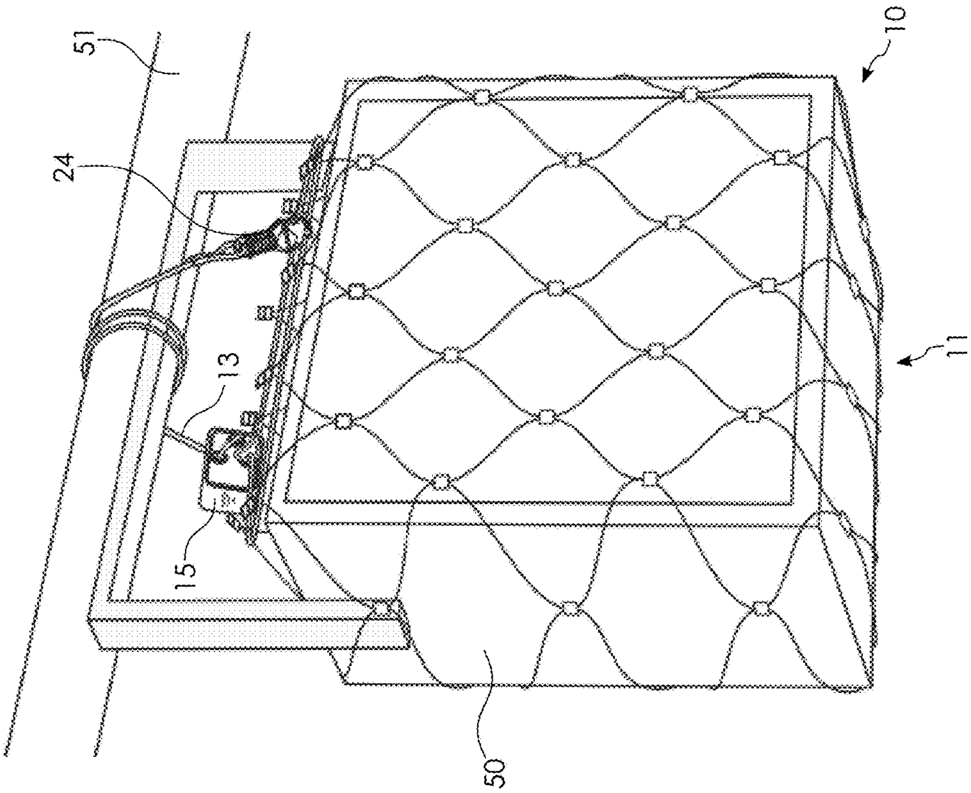
Figure 1:
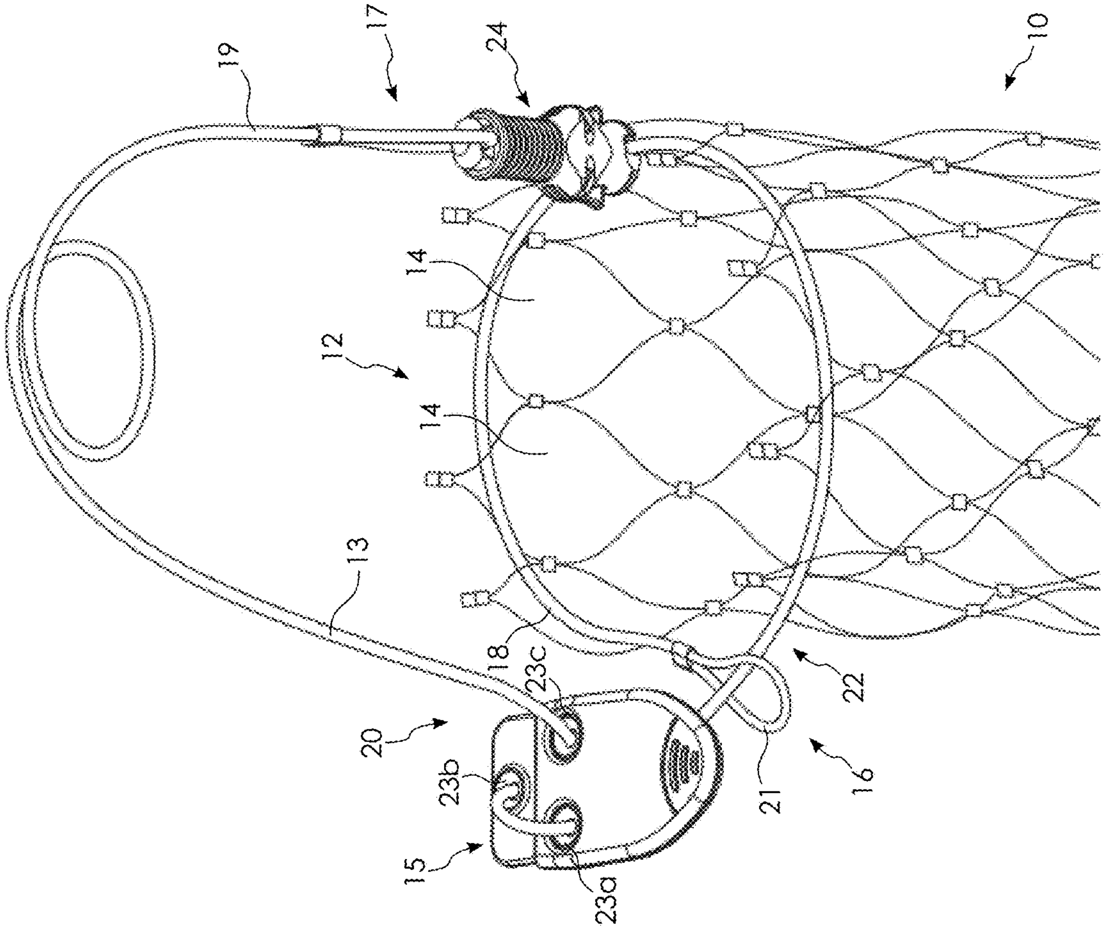
FIG. 1 is fragmentary pictorial view of an embodiment of the fall arrest safety net assembly of the invention in a collapsed state ready to receive a fixture.

Referring to FIGS. 1 and 2 of the drawings, an embodiment of a safety net assembly according to the invention includes a bag 10 constructed of wire net and having a closed end 11. Opposite the closed end 11 a mouth 12 is provided for receiving a fixture to be secured, such as a light fixture 50 mounted overhead on a member such as a beam 51. Apertures 14 of the net are spaced peripherally about the mouth 12.

A line 13 is used both to draw the mouth 12 closed and secure the bag 10 and enclosed fixture 50. The line 13 has first end 16 and opposing second end 17, first and second line portions 18, 19 of the line 13 being disposed adjacent the first end 16 and second end 17 respectively, and an intermediate line portion 20 of the line located between the first and second line portions 18 and 19. A running coupler 21 may be provided in the form of an eye on the first end 16 through which the first line portion 18 extends, with the first line portion 18 passing in a loop through the apertures 14 to form a noose 22 for drawing the mouth 12 closed.

A choker plate 15 includes a plurality of openings 23*a*, 23*b*, 23*c* through which the intermediate line portion 20 passes in turn and in this way the choker plate 15 is secured to the line outside the noose 22 and serves to fix the size of the noose 22 and thus the opening dimension of the mouth 12.

The second end 17 of the line 13 may be fixed by an eye to a fastener 24 that serves to releasably fasten the second end 17 to the line 13, for instance, to fasten back to the line 13. Advantageously, the fastener 24 is a gated fastener that, for security, requires multiple independent actions to be performed by the user to open a gate (not shown) and is of the auto-locking type (like a carabiner) whereby, after the line has been entered past the gate, release of the fastener by the user automatically closes the gate. The arrangement illustrated in FIGS. 1 and 2, in which the line 13 goes about the beam 51 and the fastener 24 is connected to the first line portion 18 is particularly preferred as the bag 10 can become suspended by two lengths of the line (those lengths extending either side of the beam 51).

Figure 3:
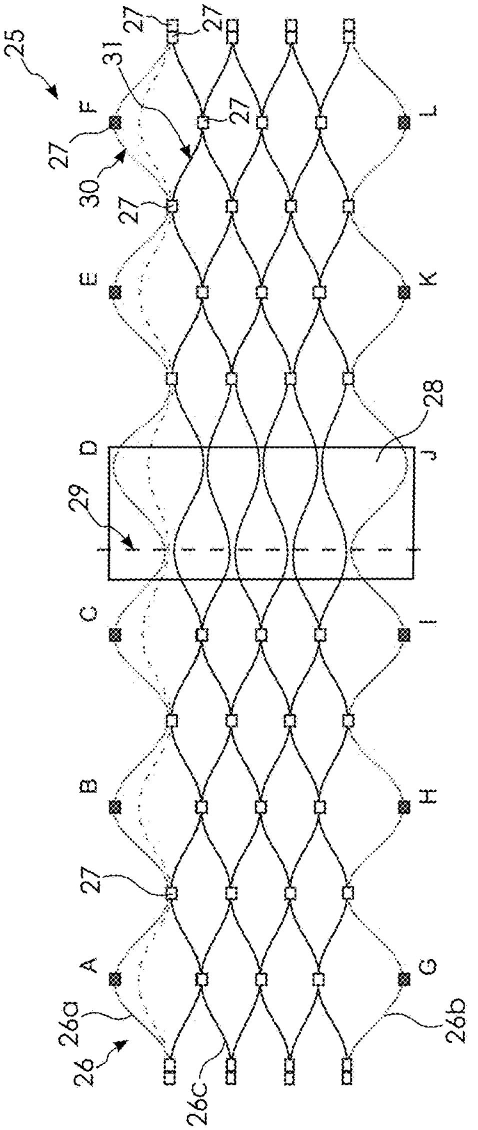
FIG. 3 is a plan view of a panel that forms the net bag of the fall arrest safety net assembly of FIG. 1.

The bag 10 is formed from a net panel 25 shown in plan view in FIG. 3 and comprising a plurality of wire lengths, referred to collectively as lengths 26, that extend alongside one another, with each length 26 connected to an adjacent one of the lengths 26 by longitudinally arrayed fixings 27 that define the nodes of the net. To better show the wave-like path of the lengths in FIG. 3 next to one another, the fixings 27 within the part of the panel 25 bounded by the rectangle 28 have been removed. The lengths 26 comprise edge lengths 26*a*, 26*b* extending along opposing edges of the panel 25. Disposed between the edge lengths 26*a*, 26*b* are internal lengths 26*c*. In the longitudinal direction, the fixings 27 alternately connect each internal length 26*c* to adjacent ones of the lengths 26. A transverse fold 29 in the net panel 25 turns the lengths 26 back on themselves, with longitudinal ends of the panel 25 being brought together to form the mouth 12. In this way, the fold 29 forms a closed end 30 of the bag 10 disposed opposite the mouth 12. After forming the fold 29, sections of at least one edge length 26*a*, 26*b* are directly connected together by the fixings 27 to form the bag 10.

In the illustrated embodiment, both longitudinal edges of the panel 25 may be connected along their lengths to form the bag. However, this is not essential to the invention, and it may be advantageous for some applications that, for instance, an entire longitudinal edge, or part of one longitudinal edge extending from the mouth 12, may not be connected back to itself, thereby allowing the bag 10 to be opened up to a greater extent and to receive a member such as a power cable.

Connecting halves of the longitudinal edges of the panel 25 together to form the bag may be achieved by connecting points in a pairwise manner as shown in FIG. 3. For instance, the pair of points C and D are connected by a fixing 27, as are the pairs of points B and E, A and F, and along the opposite edge, the pairs of points I and J, H and K, and G and L. Also, the ends of the wire lengths 26 are joined by two fixings 27, reinforcing these connections which may see higher loads in use owing to their engagement with the line 13.

Figure 4:
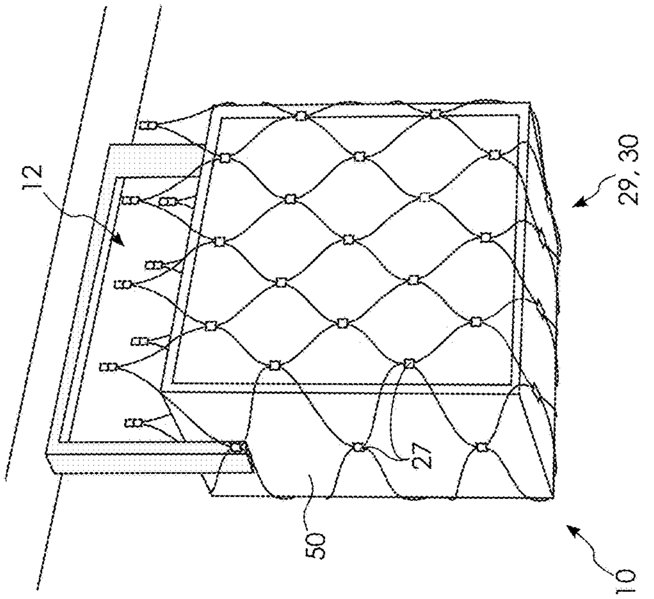
FIG. 4 is a pictorial view of a fixture received in the bag (alone)

FIGS. 3 and 4 also show a preferred feature of the bag 10, whereby the internal lengths 26*c* have the same lengthwise extent and form a first regular mesh section, while the edge lengths 26*a* and 26*b* are longer than the internal lengths 26*c*, and thus form second and third regular mesh sections on opposite sides of the bag 10 with a larger mesh size. The dashed line adjacent the edge length 26*a* illustrates the length difference compared to the adjacent internal length 26*c* and, more particularly, this difference may be described with regard to a run defined between adjacent fixings 27 along each length 26. As shown, runs of the edge lengths 26*a*, 26*b* define edge runs between adjacent fixings 27, while runs of the internal lengths 26*c* define internal runs 31. The internal runs 31 may all have substantially the same length, and the edge runs 30 also all have substantially the same length, the internal runs 31 being shorter than the edge runs 30. This construction has been found to be particularly advantageous in addressing a number of different issues. For instance, when enclosing a fixture 50 of a generally rectangular prismatic form as shown, varying the relative dimension of the edge runs 30 provides a flexibility to the manufacturing process that allows a closer to optimum net form to be achieved over a range of different fixtures and corresponding bag sizes.

A further advantage of this bag 10 is its adaptation to automated manufacturing. By orienting the lengths of each panel in the long direction, panels, optionally of different lengths, can be produced continuously. Compared to bags made by previous methods, particularly the peg-board method, whereby each panel is made by arraying a single wire length back and forth around pegs to define the desired shape before applying the fixings, substantial productivity increases are achieved.

Figure 5:
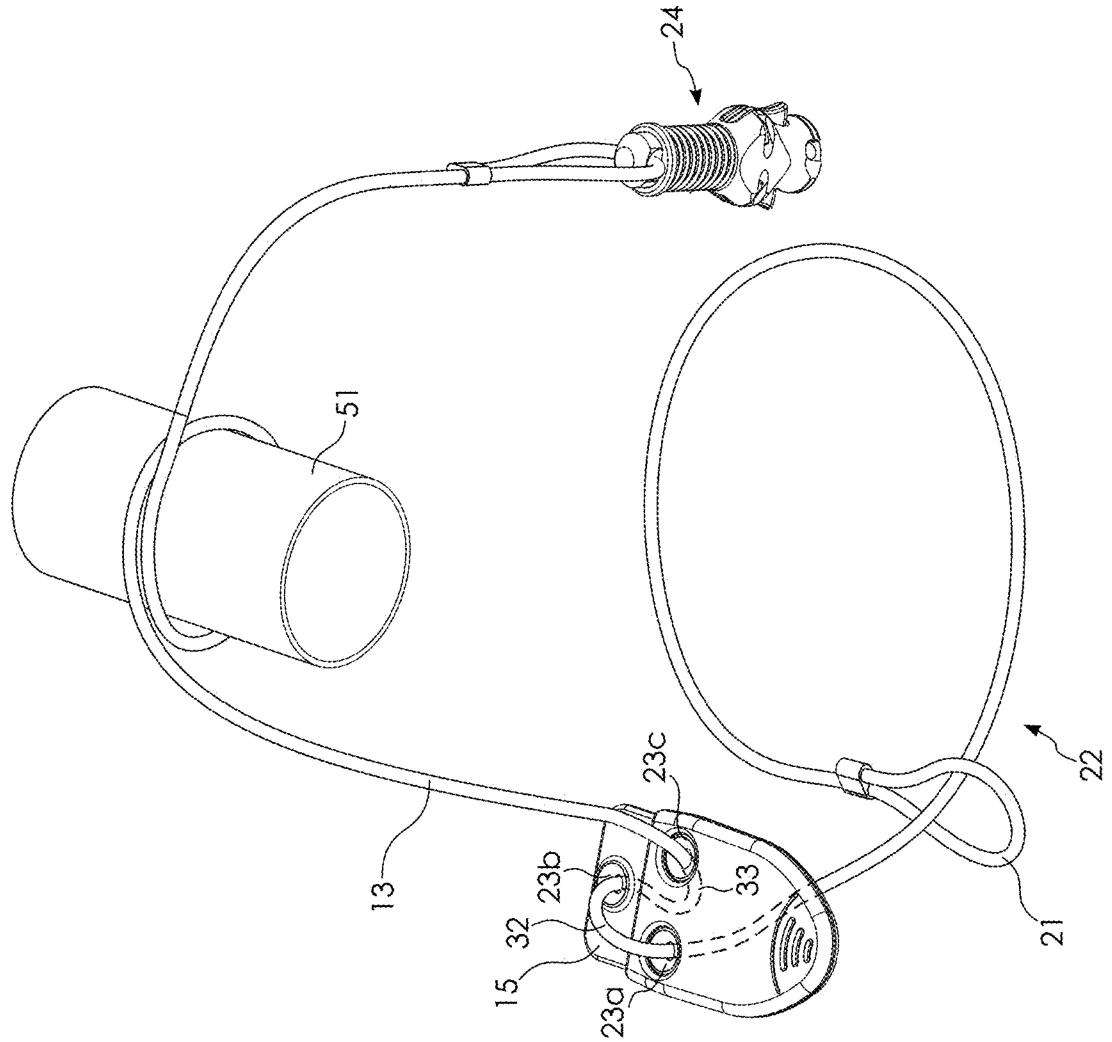
FIG. 5 shows the line assembly of the fall arrest safety net assembly of FIG. 1.

In FIG. 5, the bag 10 has been removed to plainly show the noose 22 that serves to close the mouth of the bag and the path of the line 13, including through the choker plate 15. The line 13 passes between the openings 23*a* and 23*b* forming a loop 32 on one side of the choker plate 15 then a loop 33 on the opposite side between the openings 23*b* and 23*c*. When these loops 32, 33 are made small, the choker is essentially fixed to the line 13, and the running coupler 21 cannot pass the choker plate 15. The fastener 24 is shown spaced apart from the noose 22 in FIG. 5, as before the fastener 24 is attached to the noose 22.

Figure 6:
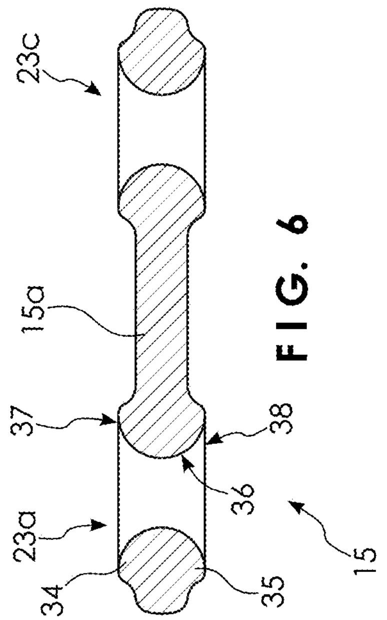
FIG. 6 is a section in a transverse plane through the choker plate of the fall arrest safety net.
Figure 7:
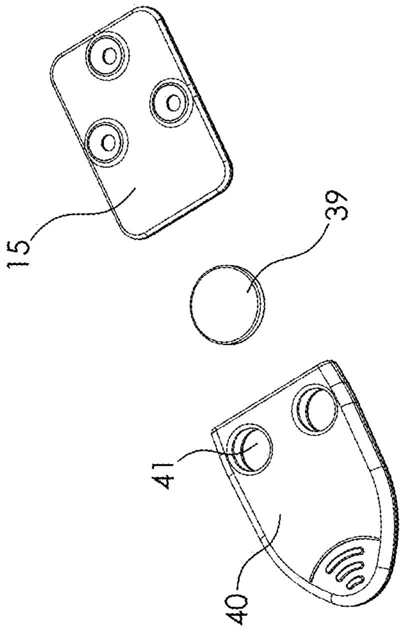
FIG. 7 is pictorial view of an RFID attachment for the choker plate.

The choker plate 15 may be forged from a substantially rectangular stainless steel plate to provide a locally-thickened section around each of the openings 23*a*, 23*b*, 23*c*. The section of FIG. 6 shows the form of the openings 23*a*, 23*b*, 23*c* in the choker plate 15 which are all alike, each formed by annular projections 34, 35 that extend from either side of the plate body 15*a* to providing the local-thickening. Each opening 23*a*, 23*b*, 23*c* has an arcuate inner surface 36 of a waisted form that tapers to diverge from a central section of the opening toward both sides. Outermost rims 37, 38 of each opening may lie in substantially parallel planes (not shown) with the arcuate inner surface 36 curved to join both planes substantially tangentially.

Furthermore, an RFID tag 39 may be fixed to the choker plate 15, allowing identification of the safety net assembly, for logistics purposes and to facilitate asset management and on-site inspection. The RFID tag 39 may be held in a polymer envelope 40 in which the choker plate 15 is at least partially received. As shown, the envelope 40 may include a through-hole 41 passing through opposite walls of the envelope 40 and positioned for registration with the annular projections 34, 35 to secure the envelope 40 to the choker plate 15.

Each of the lengths 26 is may be made of wire strands, particularly twisted stainless steel wire strands and may be continuous or discontinuous (for instance, including end-to-end joints). The result is a bag 10 with a degree of flexibility and resilience, allowing it to be expanded in a direction transverse to the lay of the wire so as to accommodate fixtures of varying size, while naturally tending to collapse against the sides of the fixture. The fixings 27 may be ferrules crimped onto the lengths.

In use, the components of the fixture 50 are first introduced through the mouth 12 thereby substantially enclosing the fixture in the bag 1. By then manipulating the choker plate 15 to draw the line 13 through the openings 23*a*, 23*b*, 23*c* the noose 22 is reduced in size to close the mouth 12. The second portion 19 of the line 13 is then looped about the member 51. The fastener 24 is then connected to the noose 22 to secure the assembly. Compared to the old safety net assembly in which the first end of the line was fixed to the choker plate, so that the choker fixed the circumference of the loop, the invention, owing to the running coupler 21 and noose 22, allows for the circumference of the noose loop to be reduced by tension in the line 13, as occurs in a drop. Under the shock loading caused by dropping a secured fixture 50, even a small amount of reduction in noose circumference that is taken up as the line 13 is tensioned, reduces the impact load factor. Likewise, the absence of sharp internal edges in the line-receiving openings of the choker plate 15 increases the breaking load of the line 13. Together, these factors allowing a higher load rating to be achieved.

Aspects of the present invention have been described by way of example only and it should be appreciated that modifications and additions may be made thereto without departing from the scope thereof.

The invention claimed is:

1. A safety net assembly comprising: a bag constructed of wire net, the bag having a mouth and a plurality of net apertures spaced peripherally about the mouth;

a line having opposing first and second ends, first and second line portions of the line being disposed adjacent the first and second ends respectively, an intermediate line portion of the line located between the first and second line portions;

a running coupler on the first end through which the first line portion extends, with the first line portion passing in a loop through the net apertures to form a noose for drawing the mouth closed;

a choker plate having opposing sides and a plurality of openings that extend between the opposing sides, wherein the intermediate line portion loops through the openings in the choker plate to secure the choker plate to the line outside the noose, wherein an RFID tag is fixed to the choker plate and is fixed to an envelope in which at least part of the choker plate is received, and a fastener fixed to the second end.

2. The safety net assembly of claim 1 wherein each of the openings in the choker plate is formed in a locally-thickened section and each opening has an arcuate inner surface that tapers to diverge from a central section of the opening toward both sides.

3. The safety net assembly of claim 2 wherein outermost rims of each opening lie in substantially parallel planes and the arcuate inner surface is curved to join both planes tangentially.

4. The safety net assembly of claim 2 wherein the locally-thickened section comprises a projection on both of the sides.

5. The safety net assembly of claim 1, wherein the openings include three openings through which the line passes sequentially so that a loop in the line protrudes from each of the faces of the choker plate.

6. The safety net assembly of claim 1 wherein the envelope comprises holes disposed in registration with the openings.

7. The safety net assembly of claim 6, wherein the running coupler comprises the first end of the line turned back on itself, and fastened to the line to form a terminal eye.

8. The safety net assembly of claim 1, wherein the bag is formed from a net panel comprising a plurality of wire lengths that extend alongside one another, each length connected to an adjacent one of the lengths by longitudinally arrayed fixings, wherein the lengths comprise edge lengths extending along edges of the panel that are opposing and internal lengths disposed between the edge lengths, and the fixings alternately connect each internal length to adjacent ones of the lengths, a fold in the net panel turns the lengths back on themselves and forms a closed end opposite the mouth, and wherein sections of at least one edge length are directly connected together by the fixings.

9. The safety net assembly of claim 8 wherein the fold is transverse to the wire lengths and longitudinal ends of the panel, are brought together to form the mouth.

10. The safety net assembly of claim 8, wherein ends of the wire lengths are joined by two of the fixings.

11. The safety net assembly of claim 8, wherein a run is defined between adjacent fixings along each length, such that runs of the internal lengths define internal runs, and runs of the edge lengths define edge runs, and wherein the internal runs all have substantially the same length.

12. The safety net assembly of claim 8 wherein the edge runs all have substantially the same length, and the internal runs are shorter than the edge runs.

13. The safety net assembly of claim 8 wherein the fixings are ferrules crimped to the lengths.

14. The safety net assembly of claim 8 wherein the wire lengths comprise metal strands twisted together.

15. The safety net assembly of claim 8 wherein there are no areas of plastic deformation in the wire lengths, and so the inherent elasticity of the wire lengths provides a resilient bag that tends to collapse to a compact closed state.

16. A method of securing apparatus mounted at height upon a construction member, the method comprising:

providing a fall arrest safety net assembly substantially as claimed in claim 1;

introducing the apparatus through the mouth so as to at least partially enclose the apparatus in the wire net bag;

manipulating the choker plate and the line to draw the mouth closed;

looping the second line portion about the construction member, and connecting the first line portion and the second end by means of a fastener.

* * * * *